UNITED STATES PATENT OFFICE 2,006,862

MANUFACTURE OF ARTICLES FROM AQUEOUS RUBBER DISPERSIONS

Merrill E. Hansen, Andrew Szegvari, and Harold A. Morton, Akron, Ohio, assignors to American Anode Incorporated, Akron, Ohio, a corporation of Delaware No Drawing. Application December 29, 1932, Serial No. 649,332

20 Claims. (Cl. 18—53)

This invention relates to the manufacture of rubber articles by depositing rubber from an aqueous dispersion upon a shaped form or mold.

A number of such methods are now well known including those wherein a form is dipped into a dispersion a number of times either with or without intermediate coagulent treatments of the deposited rubber, to acquire a rubber coating of a desired thickness; those employing a form embodying a chemical coagulant capable of diffusing into the dispersion and coagulating a coherent rubber layer at the surface of the form; and those wherein deposition of rubber particles from the dispersion is effected by electrophoretic processes.

It has been the practice to incorporate in the aqueous dispersion from which the articles are made, suitable compounding ingredients necessary to effect vulcanization of rubber deposited from the dispersion. Such ingredients generally include a vulcanizing agent, such as sulphur, an organic accelerator of vulcanization, and also a metallic activator such as a compound of zinc, lead, cadmium or magnesium, the oxide or hydroxide of such metals being the most commonly used compounds.

Heretofore, these activators together with other compounding ingredients have been added in finely dispersed form directly to the aqueous rubber dispersion. This practice has led to continuous serious difficulty because the preferred activators are at least slightly water soluble and ionize in solution to furnish polyvalent metallic ions which institute premature coagulation or thickening of the dispersion, and render it unstable and difficult to handle in manufacturing processes. Further difficulties are encountered when attempting to use high-powered accelerators in dispersions containing vulcanizing agents and activators. Such quick-vulcanizing compositions are likely to become pre-vulcanized, and as a result, produce rubber deposits which crack on drying, which have poor building tack, and which exhibit other disadvantageous properties.

It is an object of the present invention therefore, to provide a method of making articles from aqueous rubber dispersions which will involve none of the above-mentioned difficulties.

It is a further object of the invention to provide a method wherein the rubber deposit is formed from a dispersion containing none of the activator necessary to vulcanization, or containing a quantity of such activator insufficient to de-stabilize the dispersion and cause other difficulties, which quantity will be insufficient to vulcanize the rubber satisfactorily, and then introducing the necessary activator into the forming or formed deposit and subsequently vulcanizing the rubber.

According to the present new method, a rubber deposit containing a sufficient quantity of a vulcanizing agent, but containing no or an insufficient amount of activator for vulcanization of the rubber, is formed directly from an aqueous rubber dispersion in any of the well-known manners. During the deposition of the rubber, or thereafter, the necessary activator is introduced into the deposit in one of a number of ways, and either at the surface of the rubber contiguous to the form or at the opposite or outer surface, or at both surfaces.

An activating compound capable of diffusing into freshly deposited rubber may be applied to a form and a coating of rubber deposited thereover from an aqueous dispersion. In such a method during and after the formation of the deposit, the activator will diffuse into and throughout the then water-containing porous rubber structure where after drying of the rubber it will be available for subsequent vulcanization.

Alternatively, the activator may be applied directly to the surface of the freshly formed and preferably substantially undried rubber deposit, either before or after its removal from the form, and allowed to diffuse into the porous rubber structure.

In some cases, it will be desirable to introduce the activator into the rubber deposit at both faces thereof as by employing in the deposition process a form embodying an activator, and also applying an activator to the outer surface of the deposit after its formation.

The activator is preferably applied to the form, as a solution in a volatile organic solvent such as an alcohol or a ketone, etc., although less volatile solvents including water, or even suspensions of the activator in non-solvents therefor, may be used. After the application of the solution, which may be accomplished by spraying or brushing the solution onto the form, or by momentarily dipping the form into the solution, the fluid film associated with the form is dried sufficiently to produce a substantially non-flowing stratum containing the activator upon the surface of the form, from where it may diffuse into rubber deposited thereover. If the activator is applied directly to the surface of the rubber deposit, an aqueous solution thereof may be used quite satisfactorily although other vehicles such as those hereinabove mentioned may also be used.

As the present process depends upon diffusion of the activating compound into the rubber deposit, it is desirable to choose for use in the method conditions and materials most favorable to such diffusion processes. As has been indicated, the activator is preferably introduced into the rubber deposit while the latter is in the substantially undried microporous condition typical of rubber freshly deposited from an aqueous dispersion. Likewise, it is desirable to use compounds of the metallic activators which are at least partially water-soluble in order that the activator may diffuse more readily through the water-containing rubber into which it is introduced.

Among suitable metallic activating compounds are the acetate, formate, and nitrate of cadmium, lead, magnesium or zinc, or the chloride of cadmium, magnesium, or zinc, etc. The solutions or suspensions containing such compounds may at the same time contain other compatible materials such as coagulants, wetting agents, etc., although this is not essential to the present invention.

In manufacturing rubber articles according to the processes herein described, it is frequently desirable to wash the deposit with water after the deposition, but before vulcanization of the rubber. Since the preferred activating compounds employed in the present invention are more or less water-soluble, extended washing may remove a considerable portion of the activator from the deposit and leave a quantity insufficient for satisfactory vulcanization. Accordingly in many cases it will be desirable to precipitate or insolubilize the activator after its diffusion into the rubber and before the washing operation. This in most cases may be accomplished conveniently by applying to the activator-treated rubber a solution of an alkali such as ammonium, sodium, or potassium hydroxide, which will precipitate the hydroxide of the metallic activator within the rubber. Ammonia is particularly preferred for use as the precipitating agent because it is volatile and any excess thereof will be dissipated upon heating the rubber during vulcanization.

In a specific example of the present invention, a clean glove form made of glazed porcelain, glass, metal, etc., is immersed in a composition containing 100 grams of zinc chloride and 400 grams of calcium chloride dissolved in 1000 cc. of denatured alcohol. The form is withdrawn and the associated fluid coating is dried until it becomes substantially non-flowing. The coated form is then immersed in an aqueous dispersion containing 100 parts by weight of rubber added as 60% latex, 1.3 parts sulphur, 0.5 parts organic accelerator, and 1 part of an age-resister. The form is allowed to remain in the aqueous dispersion until it has acquired a coating of rubber of a desired thickness, and is then withdrawn and rotated or otherwise manipulated in air for several minutes to allow the rubber deposit to become firmly and evenly set. The rubber deposit is then immersed for thirty seconds in a 5% ammonia solution, withdrawn, and allowed to stand for a few minutes to permit the ammonia to diffuse into the rubber and to react with and insolubilize the activator. Thereafter the rubber is washed, dried, and vulcanized in the usual manner.

In the above example, the zinc chloride may be omitted from the composition applied to the form, and the zinc may be introduced into the rubber by immersing the freshly deposited rubber in a 10% aqueous solution of zinc chloride for about thirty seconds; or zinc may be introduced into the rubber in both manners in the same manufacture.

It is to be noted that although the aqueous rubber dispersion in the above example contains no metallic activator of vulcanization, the various dispersions of other compounding ingredients which are added to the latex may contain small quantities of compounds of such metals insufficient to vulcanize rubber satisfactorily. These compounds may be present either as impurities, or may be added in small quantities to serve other purposes in the composition. For instance, in some cases, a dispersion may contain a small quantity of a zinc soap added as a dispersing or stabilizing agent, but such quantity will always be less than that required to vulcanize rubber satisfactorily.

Practice of the present invention in commercial operations has eliminated many of the difficulties formerly experienced in handling aqueous dispersions containing all the compounding ingredients necessary to vulcanization and it has been found that sufficient activator may be successfully and consistently introduced into the rubber deposit by this method to produce vulcanizates excellent in all respects.

The term "rubber" has been used in a generic sense to include caoutchouc, balata, gutta percha, and similar natural or synthetic gums. Likewise the term "aqueous dispersion of rubber" includes all natural and artificial dispersions of rubber as hereinabove defined in aqueous vehicles and whether concentrated, diluted, thickened, thinned, or otherwise modified. The aqueous dispersions may contain any of the compounding ingredients commonly used in rubber manufacture except metallic activators of the type described.

Although the present invention has been described in considerable detail and with reference to certain preferred procedures and compositions, it is to be understood that numerous variations and modifications may be made in the hereinabove described methods without departing from the spirit and scope of the invention as defined in the appended claims.

We claim:

1. The method which comprises forming from an aqueous dispersion a porous deposit of non-vulcanizing rubber composition containing a substantial percentage of water distributed throughout its porous structure, introducing into the freshly deposited water-containing porous rubber a water-diffusible activator necessary for vulcanization thereof, allowing the activator to diffuse through the water into the rubber, and then drying and vulcanizing the rubber.

2. The method which comprises forming from an aqueous rubber dispersion a microporous deposit of rubber containing a substantial percentage of water distributed throughout the microporous rubber structure, said rubber containing vulcanizing agents but not an activator necessary to effect vulcanization of the rubber, introducing into the freshly deposited rubber such necessary activator in water-diffusible form, allowing the activator to diffuse throughout the water-containing porous rubber, and then drying and vulcanizing the rubber.

3. The method which comprises forming from an aqueous rubber dispersion a microporous deposit of rubber containing sufficient water distributed throughout the microporous structure to provide a substantially continuous aqueous phase, said rubber containing sufficient sulphur but insufficient zinc to effect vulcanization of the rubber, introducing into the freshly deposited water-containing rubber a quantity of an activating zinc compound in water-diffusible form, allowing the zinc compound to diffuse throughout the aqueous phase of the rubber, and then drying and vulcanizing the rubber.

4. The method which comprises depositing from an aqueous rubber dispersion upon a form a coating layer of porous rubber containing a substantial percentage of water distributed throughout the porous rubber structure, said rubber containing vulcanizing agents but not an activator necessary to effect vulcanization of the rubber, introducing into the freshly deposited water-containing rubber at the face thereof contiguous to the form a quantity of an activator of vulcanization in water-soluble form, allowing the soluble activator to diffuse throughout the water-containing porous rubber structure, and then drying and vulcanizing the rubber.

5. The method which comprises coating a form with a composition containing a metallic activator in water-diffusible form, associating the coated form with an aqueous rubber dispersion containing insufficient activator to effect vulcanization of the rubber thereof, depositing a layer of rubber from said dispersion upon the form, allowing a quantity of the activator to diffuse into the rubber while it is in a microporous condition and contains a substantial percentage of water distributed throughout the microporous rubber structure, and then drying and vulcanizing the rubber.

6. The method which comprises coating a form with a composition containing a water-soluble zinc salt, associating the coated form with an aqueous dispersion containing rubber and sufficient sulphur but insufficient zinc to effect vulcanization of the rubber, depositing a layer of rubber from said dispersion upon the form, permitting a quantity of the zinc salt to diffuse into the deposited rubber while it is in a substantially undried microporous condition and contains sufficient water to provide a substantially continuous aqueous phase extending throughout the microporous rubber structure and then drying and vulcanizing the rubber.

7. The method which comprises forming from an aqueous rubber dispersion a water-containing, porous deposit of rubber containing insufficient activator to effect vulcanization thereof, applying to the exposed surfaces of the freshly deposited water-containing rubber a water-diffusible composition containing the necessary activator, allowing a quantity of the activator to diffuse into the water-containing rubber, and then drying and vulcanizing the rubber.

8. The method which comprises forming from an aqueous rubber dispersion a water-containing, microporous deposit of rubber containing sufficient sulphur but insufficient available zinc to effect vulcanization thereof, applying to the exposed surfaces of the freshly deposited water-containing rubber a composition containing a water-soluble zinc compound, allowing a quantity of the zinc compound to diffuse into the water-containing rubber, and then drying and vulcanizing the rubber.

9. The method which comprises coating a form with a metallic activator, associating the coated form with an aqueous rubber dispersion containing insufficient activator for vulcanization of the rubber thereof, depositing a layer of rubber from said dispersion upon the form, applying to the surface of the freshly deposited rubber a composition containing a metallic activator, allowing the activators to diffuse into the rubber and vulcanizing the rubber.

10. The method which comprises coating a form with a composition containing zinc, associating the form with an aqueous rubber dispersion containing insufficient zinc for vulcanization of the rubber thereof, depositing a layer of rubber from said dispersion upon the form, applying to the surface of the freshly deposited rubber a composition containing zinc, and vulcanizing the rubber.

11. The method which comprises forming from an aqueous dispersion a rubber deposit containing an insufficient quantity of activator to effect vulcanization of the rubber, introducing into the rubber a water-soluble activator, insolubilizing the activator, and drying and vulcanizing the rubber.

12. The method which comprises forming from an aqueous rubber dispersion a rubber deposit containing an insufficient quantity of activator to effect vulcanization of the rubber, introducing into the rubber a water-soluble activator, insolubilizing the activator by treatment with an alkali, drying, and vulcanizing the rubber.

13. The method which comprises forming from an aqueous rubber dispersion a rubber deposit containing insufficient zinc available for vulcanization, introducing into the rubber a water-soluble zinc salt, precipitating the zinc in situ by treatment with an alkali, and washing, drying, and vulcanizing the rubber.

14. The method which comprises forming from an aqueous rubber dispersion a rubber deposit containing insufficient zinc available for vulcanization, introducing into the freshly deposited rubber a water-soluble zinc salt, precipitating the zinc in situ by treatment with ammonia, and washing, drying, and vulcanizing the rubber.

15. The method which comprises coating a form with a composition containing a water-soluble activator of vulcanization, depositing upon the form a layer of rubber from an aqueous rubber dispersion, allowing a quantity of the activator to diffuse into the freshly deposited rubber, insolubilizing the activator, then washing, drying and vulcanizing the rubber.

16. The method which comprises depositing upon a form a layer of rubber containing insufficient activator to effect vulcanization of the rubber, applying to the surface of the rubber a composition containing a soluble activator, allowing a quantity of the activator to diffuse into the rubber, insolubilizing the activator, and washing, drying, and vulcanizing the rubber.

17. The method which comprises coating a form with a composition containing a soluble zinc salt, depositing upon the form a layer of rubber containing insufficient zinc available for vulcanization, applying to the outer surface of the rubber a soluble zinc salt, allowing a quantity of the zinc salts to diffuse into the rubber, precipitating the zinc in situ by treatment with an alkali, and washing, drying and vulcanizing the rubber.

18. The method which comprises depositing from an aqueous dispersion upon a form a layer of rubber containing insufficient activator to effect vulcanization of the rubber, applying to the surface of the freshly deposited rubber a composition containing a water-soluble activator, allowing a quantity of the activator to diffuse into the rubber, insolubilizing the activator, and washing, drying, and vulcanizing the rubber.

19. The method which comprises coating a form with a composition containing a water-soluble zinc salt, depositing upon the form from an aqueous dispersion a layer of rubber containing insufficient zinc available for vulcanization, applying to the outer surface of the freshly deposited rubber a water-soluble zinc salt, allowing a quantity of the zinc salts to diffuse into the rubber, precipitating the zinc in situ by treatment with an alkali, and washing, drying and vulcanizing the rubber.

20. The method which comprises depositing from an aqueous dispersion upon a form a layer of rubber containing insufficient activator to effect vulcanization of the rubber, applying to the surface of the freshly deposited rubber a water-soluble zinc salt, allowing a quantity of the zinc salt to diffuse into the rubber, insolubilizing the zinc by treatment with ammonia, and washing, drying, and vulcanizing the rubber.

MERRILL E. HANSEN.
ANDREW SZEGVARI.
HAROLD A. MORTON.